Oct. 28, 1930.  J. R. UDDENBORG  1,779,834
MACHINE FOR THINNING AND CULTIVATING PLANTS
Filed Aug. 31, 1926  5 Sheets-Sheet 1
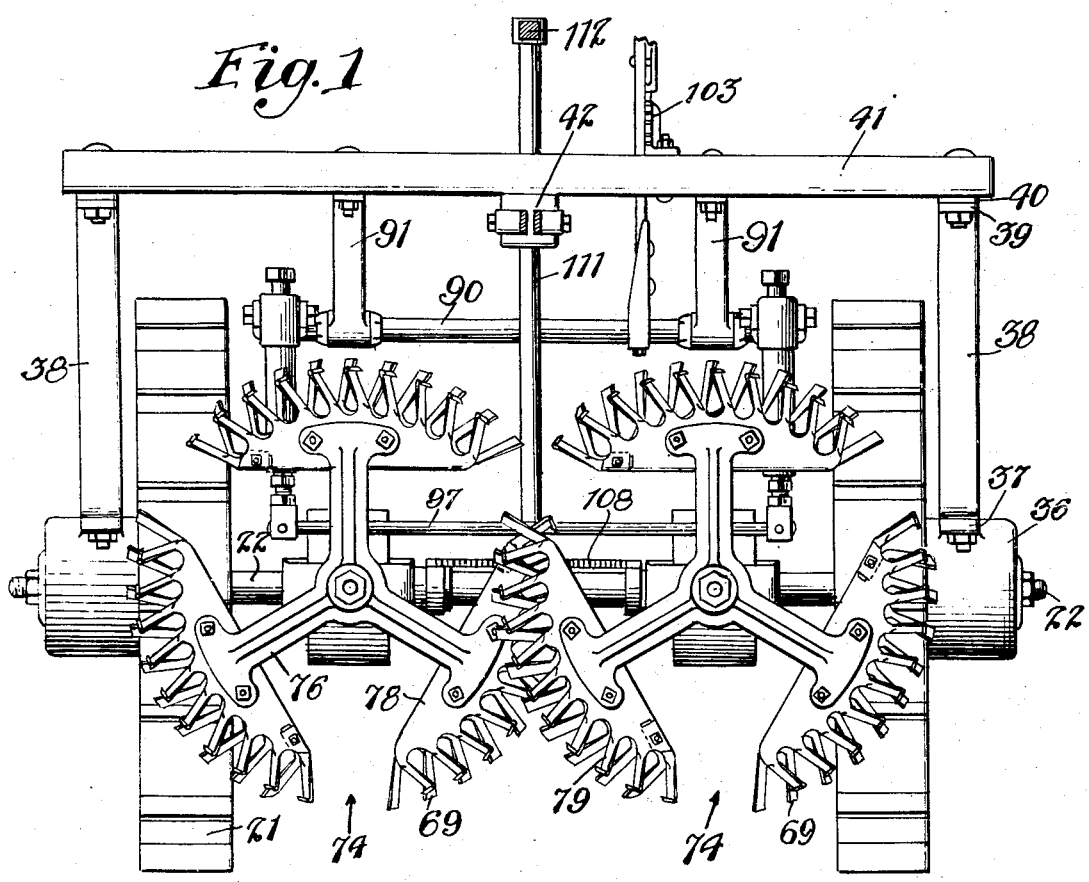
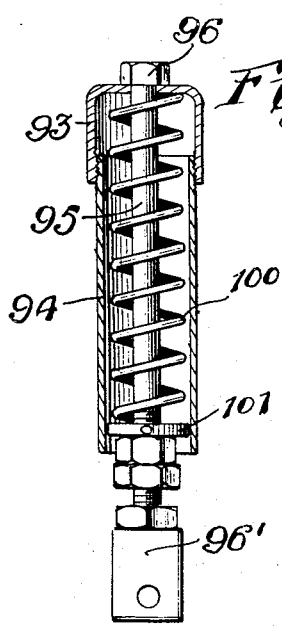
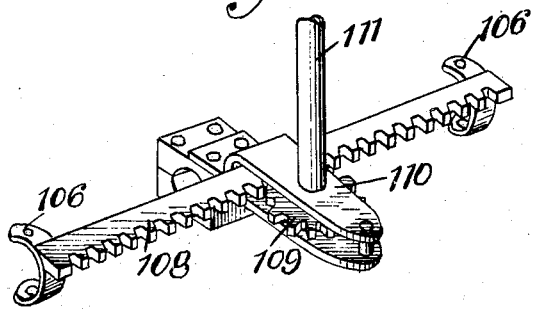
Johan Rikard Uddenborg
Inventor
By William L. Symons
his Attorney Oct. 28, 1930.    J. R. UDDENBORG    1,779,834
MACHINE FOR THINNING AND CULTIVATING PLANTS
Filed Aug. 31, 1926    5 Sheets-Sheet 2

Johan Rikard Uddenborg
Inventor

By William L. Symons
his Attorney

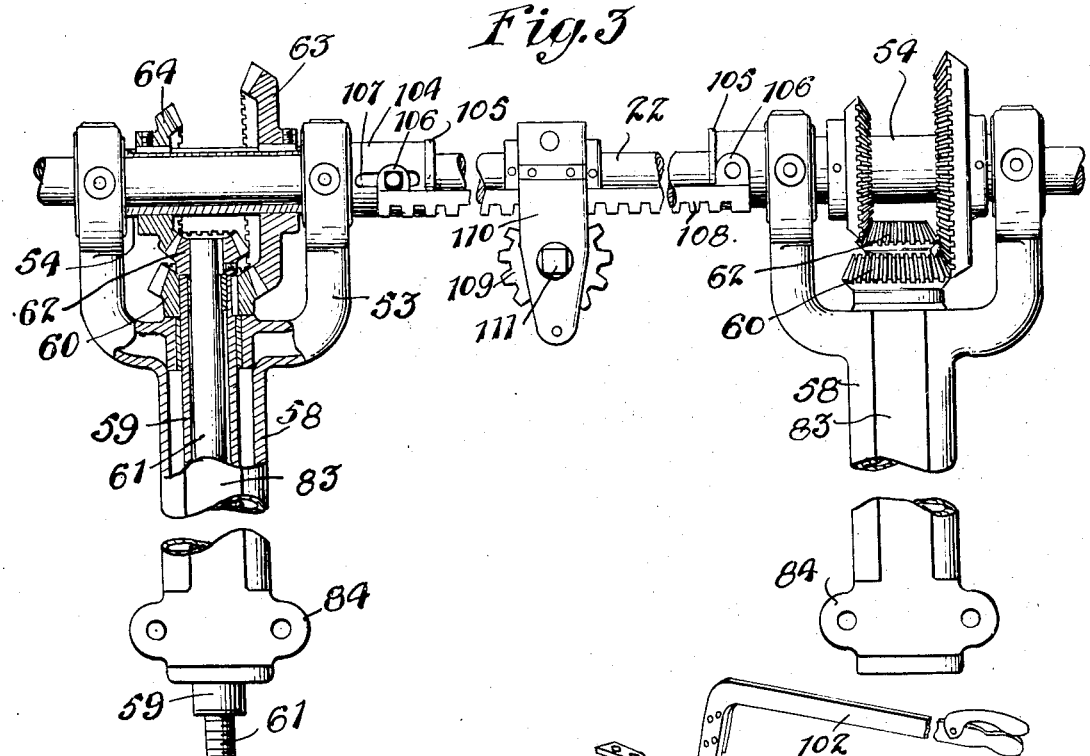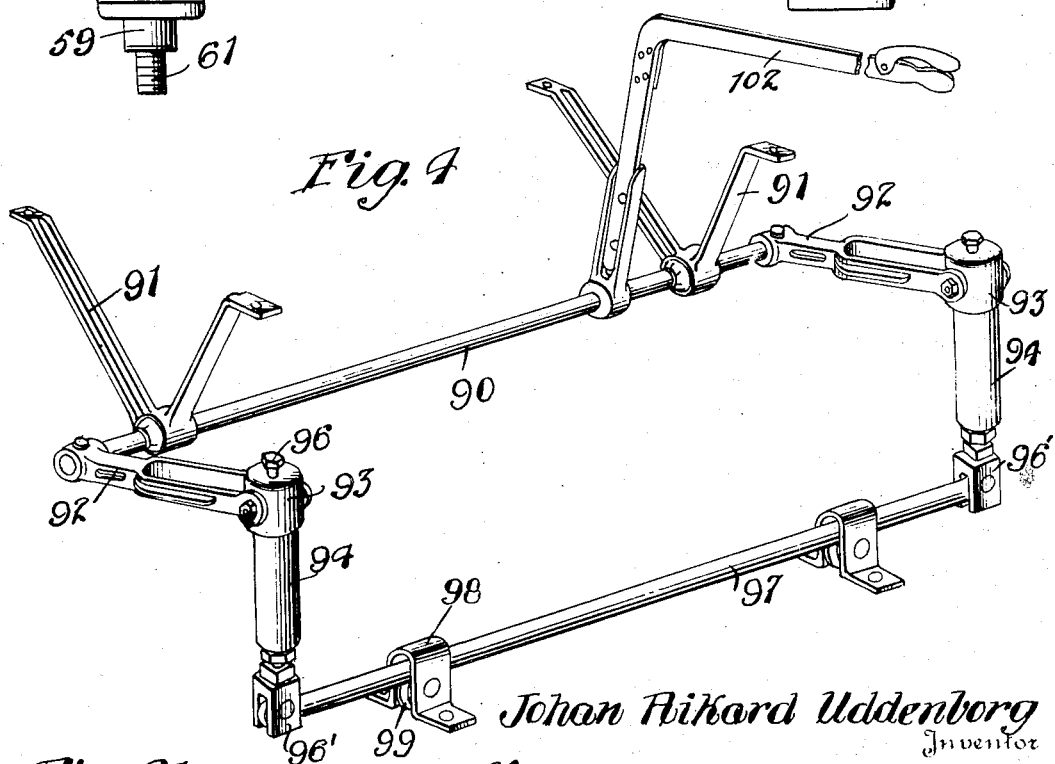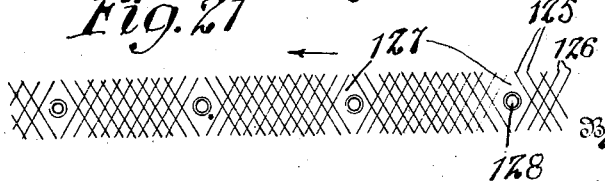

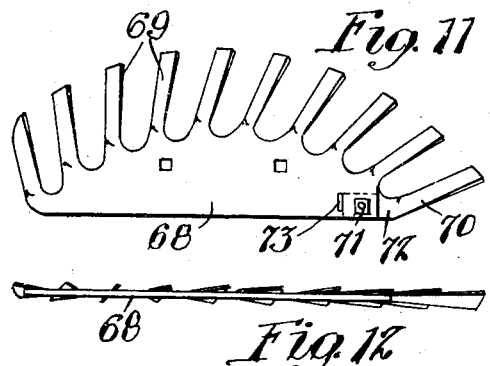
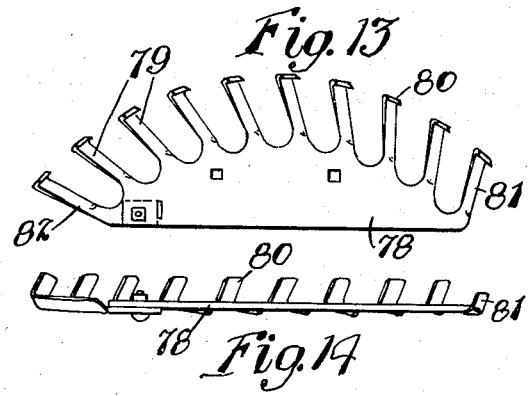
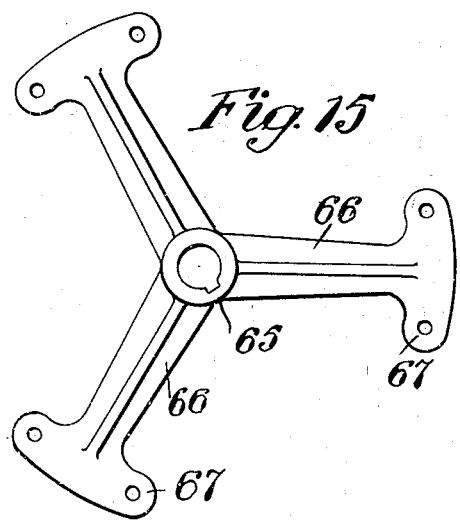
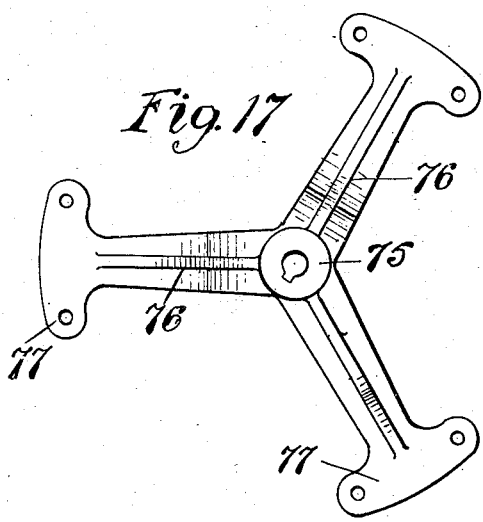
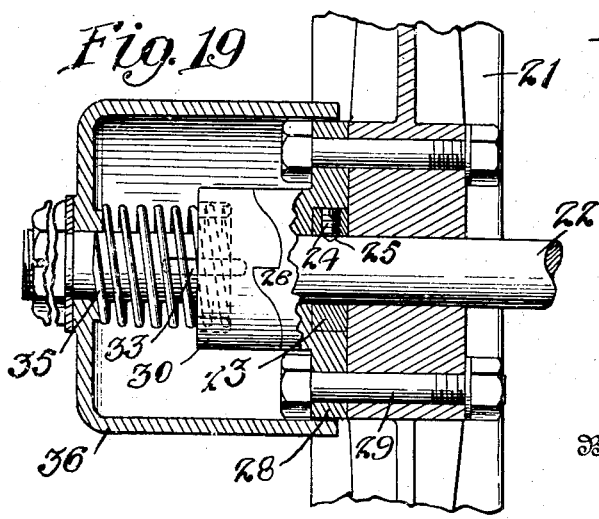
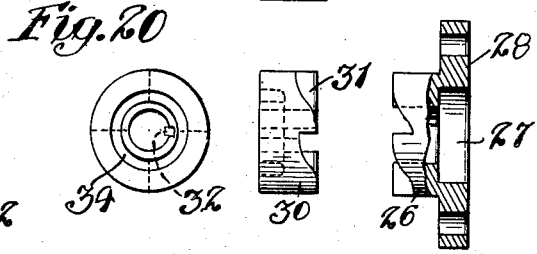

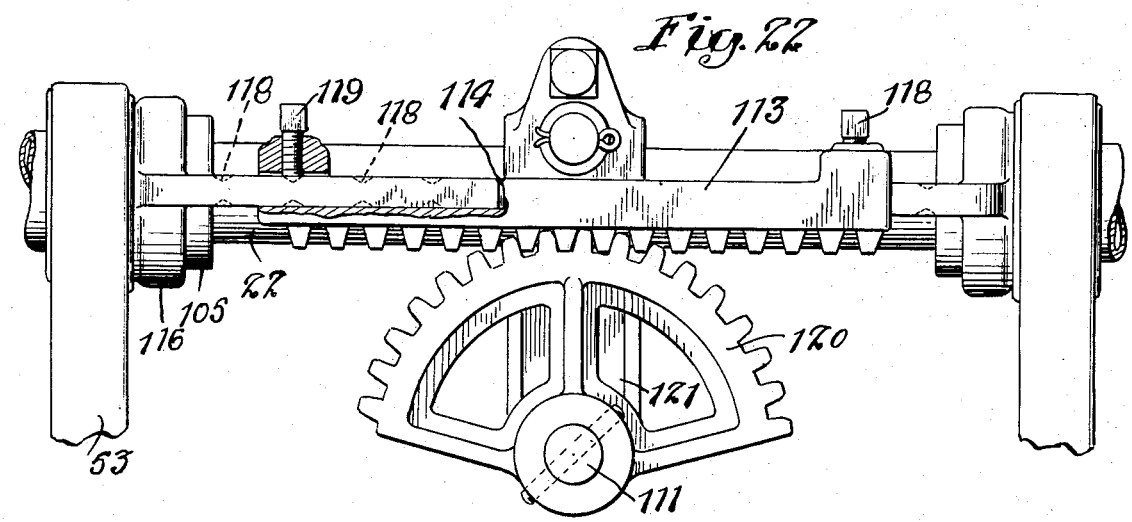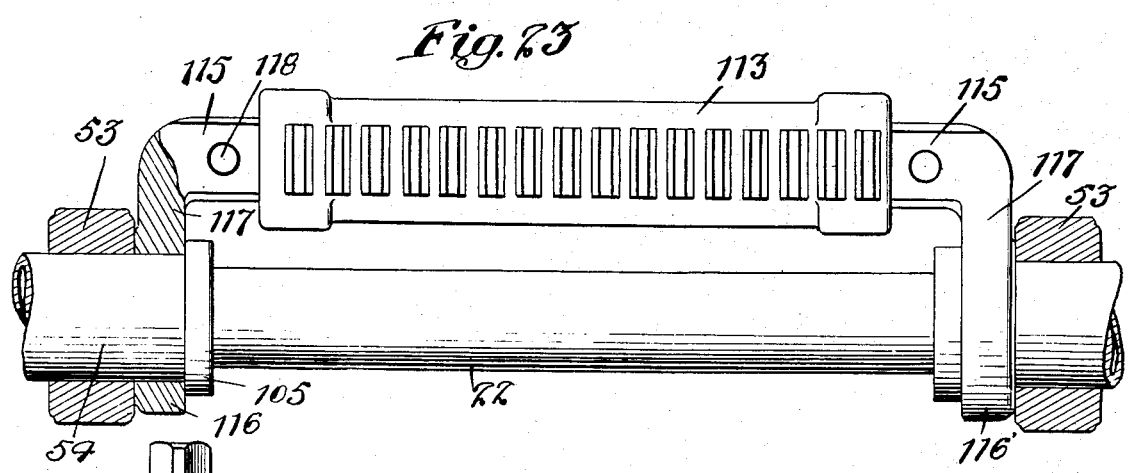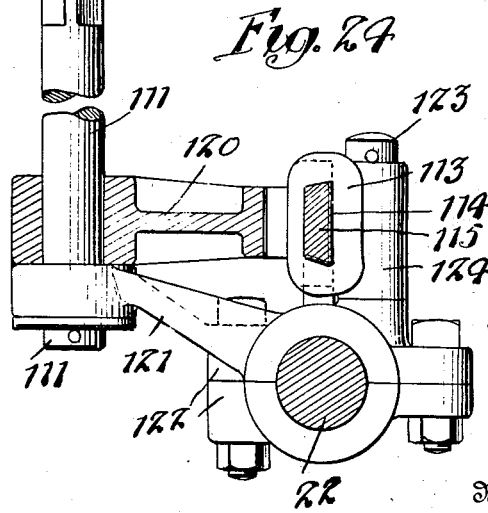

Patented Oct. 28, 1930

1,779,834

UNITED STATES PATENT OFFICE

JOHAN RIKARD UDDENBORG, OF CHICAGO, ILLINOIS

MACHINE FOR THINNING AND CULTIVATING PLANTS

Application filed August 31, 1926. Serial No. 132,833.

My invention relates to a device for thinning and cultivating plants, and is especially adapted for blocking or grouping the plants.

An important object of my invention is the provision of a device of this character which will aerate the soil during the thinning of the plants.

Another object of my invention is to provide a device of the above mentioned character which will loosen the soil without displacing it.

A further object of my invention is to provide a device of this character with novel steering means for aligning the device with the plant rows.

Yet another object of my invention is the provision of a device which is simple in construction and operation, and durable and efficient in use.

Other objects and advantages of my invention will be apparent during the course of the following description:

In the accompanying drawings which form a part of this specification and wherein like characters of reference denote like or corresponding parts throughout the same—

Figure 2:
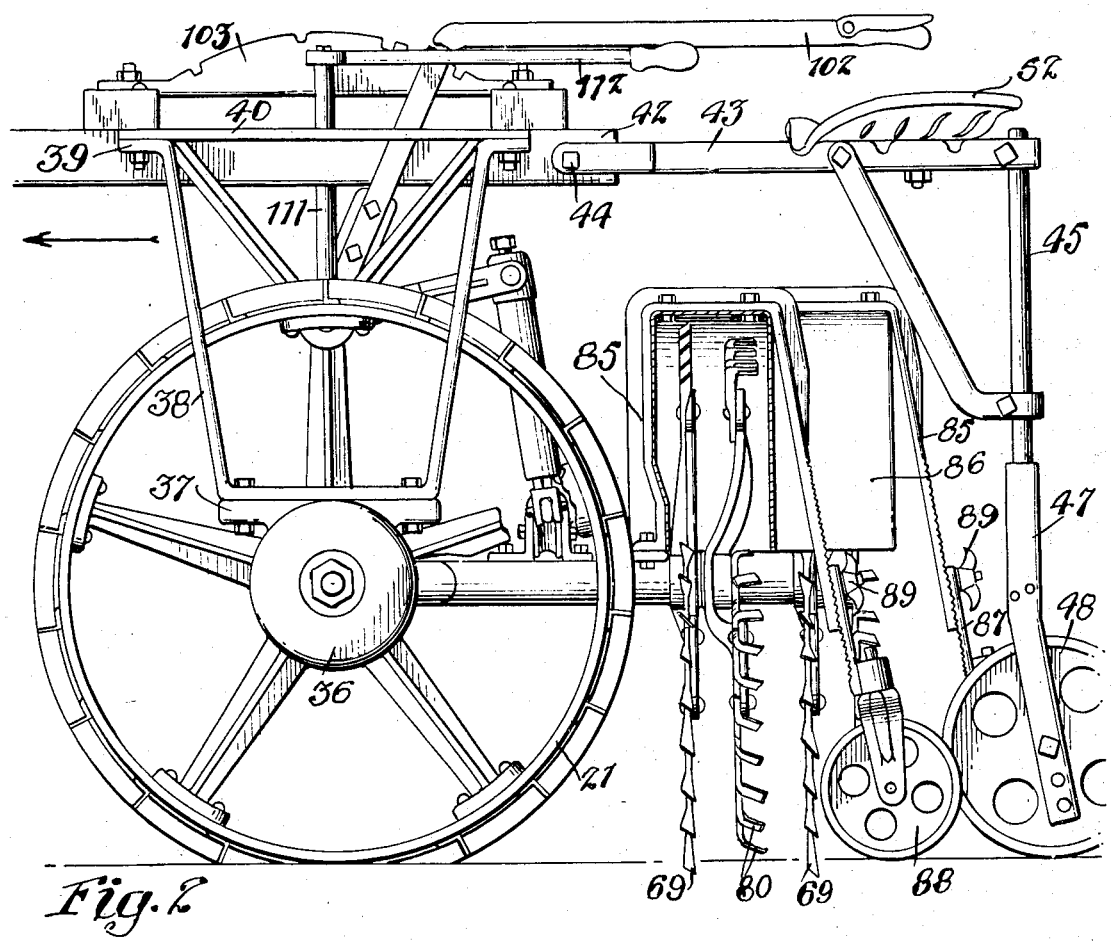
Figure 7:
Figures 8, 9:
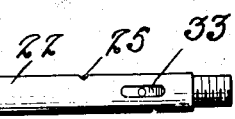
Figure 10:
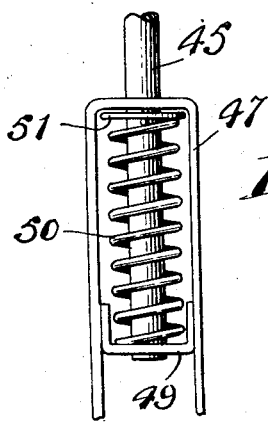

Fig. 1 is a rear elevation of my improved machine, parts being removed and broken away, Fig. 2 is a side elevation thereof, parts being broken away, Fig. 3 is a detail of the knife driving means, Fig. 4 is a detail perspective view of the means for adjusting the knives with respect to the soil, Fig. 5 is a detail perspective of the steering mechanism, Fig. 6 is a detail sectional view of the plunger and casing which hold the knives against the soil, Fig. 7 is a plan view of the main axle, parts being broken away, Fig. 8 is a transverse section therethrough, showing one of the keys in place, Fig. 9 is a transverse sectional view of one of the axle sleeves, Fig. 10 is a detail elevation of resilient seat support, Fig. 11 is an elevation of one of the soil slicing knives, Fig. 12 is a bottom plan view thereof, Fig. 13 is an elevation of one of the blocking or grouping knives, Fig. 14 is a bottom plan view thereof, Fig. 15 is an elevation of the soil slicing knife support, Fig. 16 is an edge view thereof, Fig. 17 is an elevation of the blocking or grouping knife support, Fig. 18 is an edge view thereof, Fig. 19 is a detail sectional view of the assembled clutch member, Fig. 20 is a detail of the clutch members, Fig. 21 is a diagrammatic view showing a row of plants, which have been operated on by my improved machine, Fig. 22 is a plan view of another, and preferred form, of steering gear, Fig. 23 is an elevation thereof, the pinion and its supporting elements being removed, and, Fig. 24 is vertical transverse section therethrough, parts being in elevation.

In the drawings wherein for the purpose of ilustration is shown a preferred embodiment of my invention, the numeral 21 designates the wheels of my machine, which are connected by means of an axle member 22, which extends beyond the wheels. A disk 23 is arranged on the shaft 22 adjacent the outer surface of each wheel hub and is secured to the axle by means of a set screw 24 which engages a depression 25 in the axle, the disk consequently turning with the axle. The inner section 26 of a clutch member has a recess 27 for the reception of the disk 23 and is provided with a circumferential flange 28 which is firmly secured to the wheel hub by means of bolts 29. The outer clutch section 30 surrounds the shaft 22, as does the inner section, and has teeth or projections 31 which interfit with similar teeth or projections on the inner section 26. These teeth are shaped in the usual manner to allow relative turning movement of the clutch sections in one direction only. The section 30 is provided with a peg or key 32 which engages a longitudinally extending slot 33 on the shaft 22.

The outer section 30 of the clutch is provided with annular recess 34 into which fits one end of a coil spring 35 which surrounds the shaft 32 and engages a cover 36 which fits over the end of the shaft and encloses the clutch sections and springs. The cover 36 is secured in place by means of a nut 37 screw threadedly engaging the end of the shaft 22.

It will be seen that there is a clutch member on the outer side of each wheel, and that as the wheels turn forwardly, the shaft 22 will also be rotated, due to the interengagement of the clutch sections, the outer of which are keyed to the shaft. When the wheel is turned backwardly, however, the teeth on the section 26 will force the outer section 30 outwardly against the tension of the spring 35 and the wheel and inner section 26 will turn independently of the shaft 26 and disk 23. The shaft, then, will be rotated only upon forward movement of the wheels.

Formed integrally with the clutch covers 36 are laterally extending ears 37, the upper surfaces of which are flush with the top portion of the covers, and bolted to the ears 37 are frame supports 38 which are substantially U-shaped and formed from metal strips of suitable thickness, the arms diverging upwardly and being bent over at their ends to form horizontal portions 39 for the support of longitudinally arranged, horizontal strips 40, which connect the portions 39 of the arms of each frame member 38. Spaced transverse beams 41 are bolted to the strips 40 and horizontal portions 39 of the frame supports 38, and support a centrally arranged tongue or draft appliance 42, which terminates a short distance behind the rear beam.

A piece of metal strip 43 is bent upon itself, and has its ends spread apart and surrounding the rear end of the tongue 42 to which it is pivotally secured by a bolt 44. A vertical rod 45 passes through the loop formed by bending the strip 43 upon itself and is secured therein by a bolt 46, and the lower end of the rod 45 passes through the horizontal portion of an elongated, inverted U-shaped frame member 47, between the lower portion of the arms of which is rotatably mounted the wheel 48. A crosspiece 49 connects the arms of the frame 47 adjacent the top surface of the wheel 48, and is provided with an opening to receive the end of the rod 45. A coil spring 50 surrounds the rod 45 between the piece 49 and the upper portion of the frame 47 and bears against the crosspiece 49 at its lower end, while its upper end bears against a disk 51, or the like, secured to the rod 45 to move therewith. The rod 45 is held in its upward position but may be moved downwardly against the tension of the spring 50. A seat member 52 is secured to the strip 43 adjacent the rod 45, and, it will be seen that the seat is resiliently supported by the rod 45 and spring 50.

A pair of yokes 53 are slidably mounted on the shaft 22 by means of sleeves 54 which receive the shaft. Elongated slots 55, in the shaft, receive keys 56 which fit in slots 57 in the sleeves. It will be seen that the sleeves will rotate with the shaft, but are free to slide longitudinally thereof.

The sleeves are journaled in the arms of the yokes, with which they are flush on the outside, but extend beyond the inner arms for a purpose to be hereinafter described. The arms of the yokes converge into tubular shaft supports 58 which extend longitudinally of the machine, and rearwardly of the axle 22, one of the shaft supports being longer than the other. Journaled in each of the shaft supports is a tubular shaft 59, one end of which extends beyond the forward end of the shaft support and between the arms of the yoke, said end being provided with a bevel gear 60 which is keyed thereto and abuts against the end of the shaft support 58. The other end of the tubular shaft 59 extends a short distance beyond the rear end of the support 58 for a purpose to be hereinafter described.

Journaled within the tubular shaft 59 is a shaft 61, which extends beyond the ends of the shaft 59. The forward end of the shaft 61 is provided with a bevel gear 62 which is keyed thereto and arranged immediately in front of the bevel gear 60, the gear 62 being smaller than the gear 60.

A bevel gear 63 is keyed to the sleeve 54 on the shaft 22 and engages the gear 60, to rotate the same upon rotation of the shaft 22. A bevel gear 64 is also keyed to the sleeve 54 and is smaller than the gear 63 and faces in the opposite direction. The gear 64 engages the gear 62 and rotates the same upon rotation of the shaft 22 but in the opposite direction from the gear 60. These gears are so proportioned that the shafts 59 and 61 will partake of the same number of revolutions, in opposite directions, upon rotation of the shaft 22.

A knife support 65 is keyed or otherwise rigidly secured to the rear end of the tubular shaft 59 and comprises radially extending ribbed arms 66 having enlarged end portions 67. Soil slicing knife element 68 are removably secured to the enlarged portions 67, the outer edge of the knife elements being an arc of a circle, having the shaft 59 as a center. The knife elements are made of a high grade steel, such as Swedish steel, and are cut away to form relatively narrow blades 69 which are twisted at their base to form a slight angle with the knife member 68, as shown in Figs. 11 and 12. Fig. 11 shows the end blades 70 formed separately from the knife member 68 and removably secured thereto by means of the nut and bolt 71. The body 72 of the blade 70 is provided with an upstanding lug 73 which is received in a slot in the member 68 to prevent displacement of the blade 70 about the bolt 71.

When the knife members 68 are assembled on the supporting arms 66, they form a circular outline having breaks 74 between the knife members which correspond with the group or block to be left by the machine. It will be seen that this break may be enlarged or made smaller by removing or attaching the removable blades 70. Any number of blades may be made detachable, one being shown to each member 68 for purposes of illustration only.

A knife support 75 is secured to the shaft 61, its hub abutting the hub of the support 65 and having radially extending ribbed arms 76 with enlarged end portions 77, the arms 76 being offset so that their ends are spaced a substantial distance from the ends of the arms 66 as shown in Fig. 2. Grouping or blocking knife members 78 are secured to the enlarged portions 77 of the arms 76 and are cut away to form relatively narrow blades which are twisted at their base to form a slight angle with the knife member 78. The ends of the blades 79 are bent over at a right angle to the blade, the bent over portions 80 extending in a direction opposite to the direction of travel of the machine, and consequently of the knives. The bent portions 80 of the blades are of the same length with the exception of the blade 81, which, being the first to enter the ground, is shorter than the others. The blade 82 is detachable in the same manner as the blade 70. There are the same number of knife members 78 as the members 68, and the same number of blades to each knife member. The slicing knives 69 are longer than the blocking knives 79, preferably about half an inch, although this length may be varied to suit different conditions.

The shaft supports 58 are flattened on their upper surfaces at 83 and are provided with laterally extending, horizontally arranged ears 84 to which the lower end of one of the arms of each of the substantially inverted U-shaped frames 85 is bolted. The frames 85 extend over the sets of knives and support covers or guards 86 which surround the upper half of the knife sets. The other, and rearward, arms of the frames 85 are inclined rearwardly and have their surfaces serrated to receive the serrated surfaces of the supporting arms 87 of the wheels 88 which are adjustably secured thereto by means of wing nuts and bolts 89.

A rock shaft 90 is journaled in V-shaped supports 91 which are secured to the under side of the crossbeams 41. Crank arms 92 are secured to the ends of the rock shaft outwardly of the supports 91 and have their ends bifurcated to pivotally receive the caps 93 of plunger casings 94 which extend downwardly, substantially vertically from their connection with the crank arms 92. Each of the plunger casings 94 has a plunger rod 95 which extends through a centrally arranged aperture in the cap, and has its downward movement limited by an enlarged head 96 at its upper end which abuts against the upper surface of the cap when in its lower position. The rod 95 extends entirely through the casing 94 and has a bifurcated extension 96' at its lower end, below the casing 94, which receives a flattened end of a shaft 97 which parallels the rock shaft 90 and is connected thereto by means of the bifurcated extensions 96'. The shaft 97 passes through the upper end of inverted U-shaped pulley or roller carrying frames 98 which are secured to the flattened portion 83 of the shaft supports 58, forwardly of the guard supporting frames 85. The rollers 99, arranged in the frames 98 support the shaft 97 and facilitate relative movement between the said shaft and the frames 98. Coil springs 100 are arranged within the plunger casings and surround the plunger rods 95, bearing against the caps 93 at one end and against disks, projections or the like, 101 carried by the lower end of the rods 95 within the casings.

An operating lever 102 is secured to the rock shaft 90 and engages stops on a suitable segment 103. It will be seen that rotation of the rock shaft 90 by the lever 102, which is arranged adjacent the driver, will raise the outer ends of the crank arms 92 and thus raise the casings 94 and the shaft 97 which will raise the shaft supports 58 and consequently the knife sets. It will therefore be seen that these knives may be raised or lowered at will.

The shaft supports 58, being of different lengths, place the knife sets out of alignment, as shown in Fig. 2, and they will consequently not interfere one with the other. The coil springs 100 and associated plungers 95 allow the knives to be resiliently pressed against the ground at all times to insure proper functioning of the knives.

The inner ends of the sleeves 54, which extend inwardly beyond the yokes 53, are embraced by collars 104 which are held in place by flanges 105 which allow relative turning movement between the sleeves and the collars but prevent transverse displacement of the collars. Semi-circular clasps 106 are secured to the collars 104, the connection being made adjustable by means of a slot 107 in one of the collars 104. A rack bar 108 connects the clasps 106 and serves to space the collars 104 and consequently the sleeves 54 and yokes 53. The spacing of the yokes may be varied by adjustment of the clasps 106 relative to the slot 107.

A pinion 109 engages the rack bar 108 and is supported by a frame 110 which is carried by the axle 22. A vertically arranged shaft 111 on which the pinion is mounted, passes through the frame 110 and thence upwardly through the tongue member 42 above which it is secured to an operating lever 112. When the pinion is rotated by means of the operating lever 112 and shaft 111, the rack moves the yokes 53 transversely of the shaft 22 by means of the sleeves 54, and allows the driver of the machine to keep the knives directly over the rows of plants by a single movement of the lever 112, while the adjustment of the clasp 106 relative to the slot 107 allows the knives to be adjusted to suit varying widths of rows. The rollers 99 permit the yokes 53 and shaft supports 58 to be slid transversely of the shaft 97.

In Figs. 22, 23 and 24 is shown another, and preferred, form of steering gear. The rack bar 113 is provided with a longitudinal opening or groove 114 extending its entire length and adapted to slidably receive the supporting bars 115 which are connected to collars 116 by means of right angled extensions 117, the elements 115, 116 and 117 being preferably formed integrally. The collars 116 are retained in place on the sleeves 54 by means of the flanges 105 on the inner ends of the sleeves. The bars 115 are provided with depressions 118 which are engaged by suitable set screws 119 carried by the rack bar.

It will be seen that by telescoping the bars 115 with the rack bar 113, the sleeves 54 may be spaced any desired distance and secured against displacement relative to one another by means of the set screws 119.

A segment or pinion gear 120 is mounted on the operating shaft 111, the lower end of which is journaled in the end of the arm 121, which is connected to the supporting clamp 122 which surrounds the shaft 22. A shaft 123 extends vertically above the clamp 122 and is provided with a roller 124 which is arranged immediately adjacent the rack bar 113 on the opposite side thereof from the pinion gear 120 and serves to prevent the rack bar from being forced out of engagement with the pinion. Rotation of the shaft 111 moves the rack bar and consequently the sleeves 54 and yokes 53, with respect to the shaft 22.

Fig. 21 illustrates diagrammatically the effect of the rotating knife sets on the soil and plants. The diagonal lines 125 represent the cut of the soil slicing knives 69 as they rotate during the advance of the machine and the lines 126 indicate the cut of the grouping or blocking knives 79 as they rotate in the opposite direction from the soil slicing knives, during the advance of the machine.

The space 74 between the sets of knife blades leaves an untouched block 127 which forms the plant group 128 indicated by two concentric circles. The spaces 74 between the soil slicing sets of knives and between the grouping sets of knives are timed so as to correspond at the lowest position of the knives, as shown in Fig. 1, and consequently the block will always remain untouched.

In operation the knives are spaced to correspond to the width of the rows by means of the adjustable rack bar 113, or the modified form of the rack bar, 108. As the machine is drawn across the ground, the shaft 22 will rotate the two knife sets in different directions and they will operate on the row as shown in Fig. 21. The depth of the knife cut may be adjusted by the lever 102, and the spring 100 and plunger 95 will hold the knives into yielding contact with the ground. The operator keeps the knives over the rows by moving the lever 112 which slides the entire knife operating mechanism bodily of the shaft 22 in either direction, the keys 56 and slots 57 allowing the sleeves 54 to slide transversely of the shaft 22. The frame members 38 are arranged outwardly of the wheels 21 to give complete freedom of operation to the knife operating mechanism. If for any reason the machine is reversed, the clutch members will not rotate the shaft 22 and consequently the knives will not be rotated. The entire knife mechanism may be lifted out of contact with the ground by means of the levers 102, and the depth of the cut may also be regulated by means of the serrated bar 87 and the wing nut 89. The soil slicing knives merely cut the soil into strips and loosen it for the grouping knives, the right angled blades 80 of which cut through the soil and remove the plants without displacing the soil, the blades passing beneath the surface of the soil without scooping it out. The slicing knives are longer than the grouping knives and dig down into the hard undersoil, loosening it and aerating the soil. This soil, thus deeply stirred and loosened will retain moisture.

The size of the blocks may be changed by removing or attaching blades to the knife supports, thereby rendering the machine suitable for various uses. This device is designed primarily for beet blocking but can be used for chopping and cultivating any type of plants.

Although the yokes 53 and their associated knives are illustrated as arranged rearwardly of the axle, they are so shown for the purpose of illustration only and may be placed before the axle, if desired. If additional cultivating members are necessary or desirable, they may be arranged rearwardly of the axle and the yokes and associated knives may be arranged forwardly of said axle.

While I have shown and described the preferred embodiment of my invention, it is to be understood that various changes in the size, shape and arrangement of parts may be resorted to without departing from the spirit of my invention or the scope of the subjoined claims.

Having described my invention, what I claim and desire to protect by Letters Patent is:

1. A device of the character described, comprising a set of rotating soil slicing knives adapted to loosen the soil and a set of rotating grouping knives adapted to remove plants from the soil.

2. A device of the character described comprising a set of rotating grouping knives adapted to remove plants from the soil, and a set of soil slicing knives rotating in the opposite direction from the grouping knives and adapted to loosen the soil ahead of the grouping knives, said soil slicing knives being longer than the grouping knives.

3. A device of the character described comprising a set of grouping knives adapted to remove the plants from the soil, said grouping knives being arranged in spaced series, and a set of soil slicing knives adapted to rotate in the opposite direction from the grouping knives to loosen the soil ahead of the grouping knives, the soil slicing knives being arranged in spaced series, the spaces between the sets of knives being adapted to correspond to leave spaced groups of plants untouched by the knives.

4. A device of the character described comprising a tubular shaft adapted for rotation, a shaft arranged within said tubular shaft and adapted for rotation in the opposite direction from the tubular shaft, the second named shaft extending beyond the tubular shaft, a knife support secured to the end of the tubular shaft and comprising radial arms, knife elements secured to said arms, soil slicing blades secured to said knife elements and being twisted about their longitudinal axis, the knife elements being equally spaced from each other and the ends of all of the blades lying in the circumference of a circle, having the tubular shaft as a center, the knife elements rotating with the tubular shaft to loosen the soil, a knife support secured to the second named shaft and comprising radial arms, knife elements secured to said last named arms, said knife elements being equally spaced, grouping blades secured to said last named knife member, said grouping blades being twisted about their longitudinal axis and having their ends bent over at right angles and extending in a direction opposite to the direction in which the knives are adapted to be moved over the ground, the grouping knives being adapted to remove the plants from the loosened soil, and the spaces between the knife elements of the soil slicing and the grouping knives being adapted to correspond as they reach the soil in order to leave groups of plants untouched.

5. A device of the character described comprising a set of grouping knives arranged with their ends in the circumference of a circle, the knives being divided into spaced series, one knife of each series, immediately adjacent the spaces between the series being detachable, the grouping knives being adapted to remove the plants from the soil, and a set of soil slicing knives adapted to loosen the soil for the grouping knives and having their ends arranged in the circumference of a circle, the soil slicing knives being divided into spaced series, one knife of each series immediately adjacent the spaces between the series being detachable, the spaces between the two sets of knives being adapted to correspond to leave groups of plants untouched by the knives, the size of these groups being determined by the number of blades in each series.

6. A device of the character described comprising soil slicing knives, grouping knives arranged to cooperate with the soil slicing knives, means for raising and lowering the two sets of knives, and means for resiliently pressing the knives against the soil, the tension of the resilient means being unaffected by the raising or lowering of the knives.

7. A device of the character described comprising a pair of traction wheels, an axle secured thereto, soil slicing knives geared to said axle and rotated thereby, grouping knives geared to said axle and rotated thereby in an opposite direction from the rotation of the soil slicing knives, and a steering mechanism comprising means to shift the knives and knife operating mechanism axially of the axle.

8. A device of the character described comprising a pair of traction wheels, an axle secured thereto, a sleeve keyed to said axle to turn therewith and capable of axial movement thereof, a yoke mounted on said sleeve, a shaft journaled in said yoke and geared to said sleeve to be rotated thereby, a set of soil slicing knives mounted on said shaft and rotating therewith, a second shaft journaled within said yoke and geared to the sleeve to be rotated thereby in a direction opposite to the direction of rotation of the first named shaft, a set of grouping knives mounted on the second named shaft adjacent the soil slicing knives and rotating with said second named shaft, and means to shift said sets of knives, yoke and sleeve axially of the axle.

9. A device of the character described comprising, a pair of traction wheels, an axle secured thereto, a pair of spaced sleeves keyed to said axle to turn therewith, and capable of axial movement thereof, yokes mounted on said sleeves, shafts journaled in said yokes, and geared to said sleeves to turn therewith, soil treating members mounted on said shafts, a bar connecting said sleeves to space the same, means to vary the distance between said sleeves, and means to move said bar to shift the sleeves and associated yokes and soil treating members axially of the axle.

10. A device of the character described, comprising a pair of traction wheels, an axle secured thereto and arranged therebetween and rotated thereby, spaced sleeves keyed to said axle to be rotated thereby and capable of axial movement thereof, yokes mounted on said sleeves, shafts journaled in said yokes, and operatively connected thereto to be rotated thereby, soil treating members mounted on said shafts, a rack bar connecting the sleeves and having an adjustable connection for regulating the space between the sleeves, and a pinion engaging the rack bar and adapted when rotated, to move the sleeves and their associated yokes axially of the axle.

11. A device of the character described comprising a pair of traction wheels, an axle secured thereto, a sleeve keyed to said axle to be rotated thereby and being capable of axial movement thereof, a yoke mounted on said sleeve, a shaft journaled in said yoke and operatively connected to the sleeve to be rotated thereby, a soil treating member secured to said shaft, means to raise and lower said yoke and soil treating member, means resiliently forcing said yoke and soil treating member downwardly, and means to shift said sleeve axially of the axle and transversely of the resilient means and of the raising and lowering means.

12. A device of the character described comprising a pair of traction wheels, an axle arranged therebetween and secured thereto to be rotated thereby and extending through and beyond the wheels, clutch members arranged on the axles, exteriorly of the wheels, whereby the axle will be stationary during backward rotation of the wheels, side frame members arranged exteriorly of the wheels and supported by the axle, a transverse frame member connecting the side frame members, spaced sleeves keyed to the axle to rotate therewith and capable of axial movement thereof, yokes mounted on said sleeves, shafts journaled in said yokes and operatively connected to said sleeves to be rotated thereby upon rotation of the axle, soil treating members secured to said shafts, a rock shaft supported by said transverse frame member, crank arms carried by said rock shaft, plunger casings supported by said crank arms to be moved in a substantially vertical plane upon rotation of the rock shaft, spring pressed plungers arranged in said plunger casings, a transversely arranged shaft connecting the ends of the plungers and slidably connected to said yokes to support the same, the plungers being adapted to resiliently press the soil treating member against the soil, a rack bar adjustably connected to said sleeves to space the same, and means to move the bar to shift the sleeves and associated yokes transversely of the axle.

13. A device of the character described comprising soil slicing knives, grouping knives arranged to cooperate with the soil slicing knives, and means for raising and lowering the two sets of knives.

14. A device of the character described comprising soil slicing knives, grouping knives arranged to cooperate with the soil slicing knives, and means for resiliently pressing the knives against the soil.

15. A device of the character described comprising a pair of traction wheels, an axle secured thereto, spaced soil treating members geared to said axle, means to vary the space between said soil treating members, and a steering mechanism comprising means to shift said soil treating members axially of the axle.

16. A device of the character described comprising a pair of traction wheels, an axle secured thereto, a pair of spaced sleeves keyed to said axle to turn therewith, soil treating members geared to said sleeves, means connecting said sleeves to space the same, and means to vary the space between said sleeves.

17. A device of the character described comprising a pair of traction wheels connected by a frame, an axle secured to the wheels, a transverse rod, resilient means connecting the rod with the frame, a soil treating member geared to said axle and supported by said transverse bar and capable of transverse movement thereof.

18. A device of the character described comprising a pair of traction wheels connected by a frame, an axle secured to said wheels, a rock shaft mounted on said frame, a transverse bar resiliently connected to said rock shaft by means of a crank, and a soil treating member geared to said axle and supported by the transverse rod and capable of transverse movement relative to the rod.

19. A device of the character described comprising a traction wheel, an axle secured thereto, a shaft geared to said axle to turn therewith, a soil treating member carried by said shaft, a rack bar connected with the shaft, and a pinion engaging said rack bar and adapted when rotated to impart axial movement to the shaft relative to the axle.

20. A device of the character described comprising a tubular shaft adapted for rotation, a shaft arranged within said tubular shaft and adapted for rotation in an opposite direction therefrom, the second named shaft extending beyond the tubular shaft, a soil slicing knife secured to said tubular shaft and comprising a series of flat blades, said blades being twisted about their longitudinal axes so that each blade will present its edge to the soil to slice the same, and a grouping knife secured to the second named shaft and comprising a series of flat blades twisted about their longitudinal axes and having their ends bent over at right angles and extending in a direction opposite to the direction in which the knives are adapted to be moved over the ground, said grouping blades being shorter than the slicing knives and having their edges sharpened, said grouping blades being adapted to pass through the loosened soil edgewise so as to remove the plants in the soil without materially displacing said soil.

21. A device of the character described comprising a soil slicing knife arranged for rotation and comprising a series of flat blades, said blades being twisted about their longitudinal axes so that each blade will present its edge to the soil to slice the same, the edges of the blades presented to the soil being sharpened, and a grouping knife arranged adjacent said soil slicing knife and adapted for rotation in a direction opposite to the direction of rotation of the soil slicing knife, said grouping knife comprising a series of flat blades twisted about their longitudinal axes and having their ends bent over at right angles and extending in a direction opposite to the direction in which the knives are adapted to be moved over the ground, the edges of the grouping blades being sharpened, said grouping knives being adapted to pass through the loosened soil edgewise so as to remove the plants from the soil without materially displacing said soil.

22. A device of the character described comprising a soil slicing knife adapted for rotation and comprising sharpened blades adapted to slip through the soil to slice the same without materially displacing the soil, and a grouping knife arranged to cooperate with the slicing knife and comprising sharpened blades bent over at their ends and adapted to slip under the loosened soil to remove plants therefrom without materially displacing the soil.

In testimony whereof I affix my signature.

JOHAN RIKARD UDDENBORG.